United States Patent

[11] 3,587,248

[72] Inventor Romeo O. Umanos
Livonia, Mich.
[21] Appl. No. 864,791
[22] Filed Oct. 8, 1969
[45] Patented June 28, 1971
[73] Assignee General Motor Corporations,
Detroit, Mich.

[54] CABLE COUPLING
3 Claims, 5 Drawing Figs.
[52] U.S. Cl. .................................................. 64/4
[51] Int. Cl. .................................................. F16c 1/26
[50] Field of Search ........................................... 64/4;
287/130; 74/11, 12

[56] References Cited
UNITED STATES PATENTS
2,893,221 7/1959 Bell .............................. 64/4

3,234,757 2/1966 Stadelmann .................. 64/4
3,335,580 8/1967 Simpson ....................... 64/4

Primary Examiner—Fred C. Mattern, Jr.
Assistant Examiner—Randall Heald
Attorneys—Jean L. Carpenter and Arthur N. Krein ABSTRACT: A coupling for connecting a drive cable to a rotary member wherein the coupling has an oval flexible ring joined to the main body of the coupling by two struts whereby the oval ring is adapted to snap over an annular flange on a boss of the rotary member to retain the coupling in place, but which can be released from the rotary member by pressing on the oval ring adjacent to the struts to bulge the sides of the oval ring so that the shape of the ring approaches a circle larger in diameter than the annular flange.

PATENTED JUN28 1971 3,587,248

INVENTOR
Romeo O. Umanos
BY
Arthur N. Krein
ATTORNEY

CABLE COUPLING

This invention relates to coupling, and, more particularly, to a coupling for connecting two rotatable members in rotary driving, axially retained relation.

More specifically, the invention relates to a snap-on coupling or ferrule that is particularly adapted for use to releasably couple a flexible shaft or cable between a drive mechanism and a driven mechanism.

Prior constructions of this type have commonly utilized a threaded connector on the end of the flexible cable to form the connection between the drive cable and the drive motor and seat actuator in a vehicle seat actuator mechanism, for example, as shown in U.S. Pat. No. 3,220,975 issued Feb. 27, 1962, to George B. Horton and Thomas E. Lohr. While this provides a satisfactory connection, it requires that the connector be formed with an internal thread and that the unit to which it is attached be provided with an externally threaded projection. In addition to the added cost in forming these parts, the threaded connection has caused difficulty in effecting engagement or disengagement of the drive cable with its related drive or driven mechanism because of space limitation in the vehicle.

Accordingly, an object of this invention is to improve cable couplings whereby the cable coupling can be engaged with and disengaged from the cooperating rotary member without reliance on any threaded connection therebetween.

Another object of this invention is to improve a flexible shaft coupling whereby the coupling may be snapped onto a cooperating rotary member for operative engagement therewith.

These and other objects of the invention are attained by means of a coupling made of plastic or other suitable flexible material in which the coupling has a stepped cylindrical body portion and an oval ring portion spaced from the body portion but connected thereto by struts whereby elongated slots are provided between the ring portion and the main body portion of the coupling. The coupling is thus adapted to be snapped over a flanged extension of the cooperating rotary member so that the flange thereon catches in the elongated slots of the coupling to retain these parts in cooperating relation to each other. Uncoupling is achieved through squeezing the radial end of the oval ring of the coupling causing a bulging of the side thereof so that the shape of this ring now approaches a circular configuration having a diameter larger than the outside diameter of the flange of the extension.

For a better understanding of of the invention, as well as other objects and further features thereof, reference is had to the following detailed description of the invention to be read in connection with the accompanying drawings, wherein.

Figure 1:
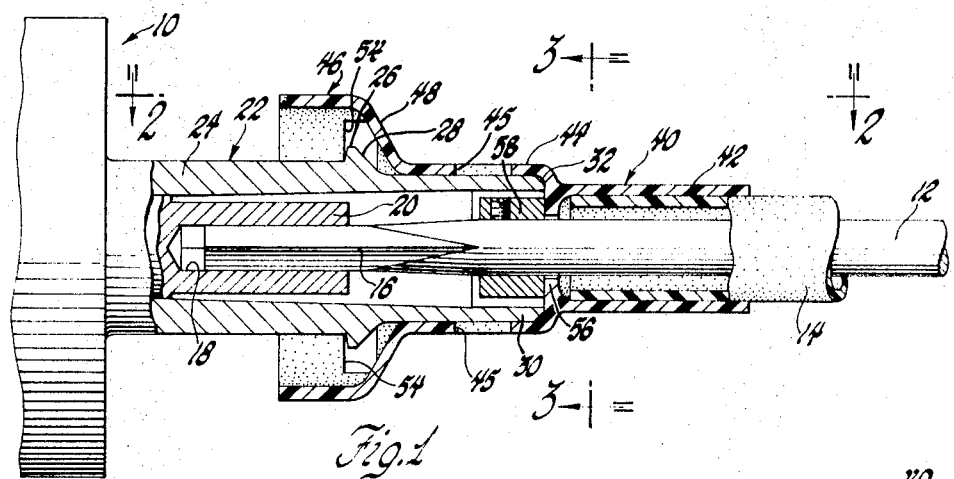
FIG. 1 is a view of a flexible shaft and rotary mechanism coupled together by means of a coupling constructed in accordance with the invention, with parts broken away to show details of the structure.

Since the opposite end of a flexible shaft would normally be the same so that the connection to a driven mechanism would be the same as that to the drive mechanism, FIG. 1 contains only an illustration of one end of a flexible shaft, that is, the end of a flexible shaft which is connected to a suitable drive mechanism generally indicated at 10. As illustrated, a flexible shaft or cable 12 provided with a cylindrical casing 14 has a suitably shaped end portion, such as square-shaped end portion 16 which is received in a complementary shaped bore 18 in the end of a drive shaft 20 of drive mechanism 10. The drive shaft 20 is suitably journaled to rotate within the extension 22 of a casing of the drive mechanism 10, the details of which are not shown or described since it forms no part of the subject invention. Extension 22 comprises a cylindrical boss having a hub portion 24 radially extending flanged portion 26, a tapered transitional portion 28 and a terminal portion 20 having a chamber 32 at the ends thereof.

Figure 3:
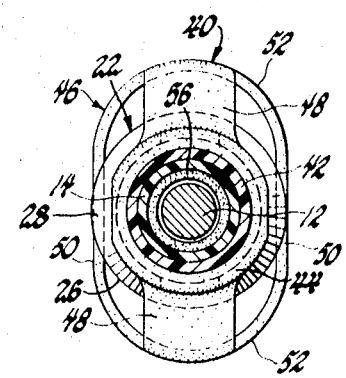
FIG. 3 is a sectional view taken along line 3-3 of FIG. 1 illustrating the coupling when in the free state.
Figure 5:
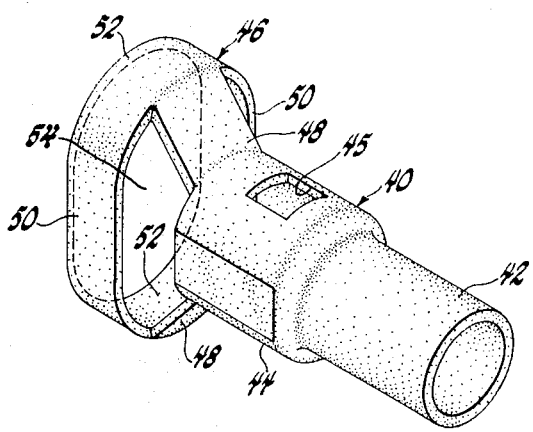

The coupling or ferrule of the invention, generally indicated by the reference numeral 40, is made of a suitable flexible material and is tubular in shape with a casing gripping portion 42, a central portion 44 and a ring portion 46 spaced from, but joined to, the central portion 44 by struts 48. The casing gripping portion 42 has an internal diameter approximately equal to the external diameter of casing 14 to which it is secured in any suitable manner. Central portion 44 has an internal diameter preferably slightly larger than the external diameter of terminal portion 30 of extension 22. The ring portion 46 is oblong and somewhat oval in shape if in the free state, as seen in FIG. 3, with elongated side portions 50 joined together at their ends by semicircular portions 52 to which struts 48 are attached. With this arrangement, there is provided elongated slots 54 between the central portion 44 and the side portions 50 of ring portion 46. In this free state, the side portions 50, illustrated in the preferred embodiment as being flat, are spaced apart a distance less than the external diameter of flange portion 26 of extension 22. In the embodiment of the coupling shown, a transverse wall or flange 56 having an axial spacing with regard opening therein is provided between the casing gripping portion 42 and central portion 44 which serves as the seat for a thrust collar 58 encircling cable 12 to retain it in axial spacing with regard to the coupling and which can be used to retain the coupling on the core and thus, on the casing, although if desired, the coupling can also be secured to the casing directly as by being cemented thereto. Openings 45 in central portion 44 provide access to adjust the thrust collar 58 prior to assembly to drive mechanism 10.

Figure 2:
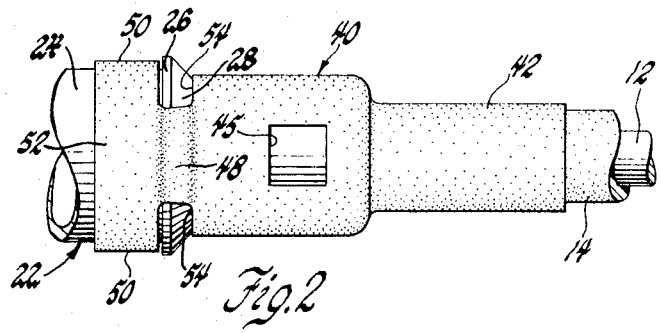
FIG. 2 is a view taken along line 2-2 of FIG. 1.

In order to secure the flexible shaft to the drive mechanism 10, the coupling 40 which has previously been secured to the flexible shaft is pushed onto the terminal portion 30 of extension 22 with the squared end 16 of cable 12 aligned with bore 18 in the end of drive shaft 20 and, then the coupling is forced onto the extension, to the left as seen in FIG. 1, until the side portions 50 engage the tapered transitional portion 28 at which time the side portions will become deformed to slide over the flange portion 26, at which time the side portion 50 will snap back to the free state and engage behind the flange 26 to lock the flexible shaft assembly to the drive mechanism, as seen in FIGS. 2 and 3.

Figure 4:
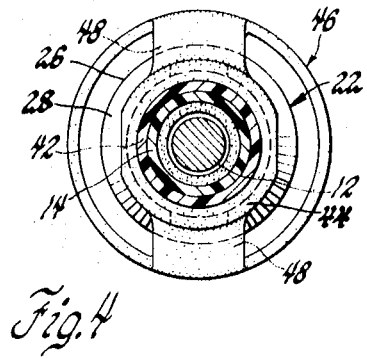
FIG. 4 is a view similar to FIG. 3 but illustrating the coupling with its ring in the deformed state; and, FIG. 5 is a perspective view of the coupling per se.

Uncoupling is achieved by squeezing the radial end, that is, the semicircular portion 52, of the coupling ring 46 causing a bulging of the flat side portions 50 so that the shape of ring 46 approaches a circular configuration as shown in FIG. 4. To permit uncoupling, the internal perimeter of the ring 46 is of such a length, so that when deformed to this circular configuration, the internal diameter of this circle is substantially greater than the external diameter of the flange portion 26 to allow free passage of ring 46 over this flange during removal of the coupling, as shown in FIG. 4.

To permit the ring 46 to be flexed in the above described manner, the coupling is made of a suitable flexible material. A suitable class of flexible material to form the coupling and the resilient ring thereon are plastics, such as acetal resin plastics. One particularly suitable acetal resin is Delrin, a trademark of the E. I. du Pont de Nemours & Co., Inc., of Wilmington, Delaware, for an acetal resin having a chemical structure represented by the formula $[-OCH_2-]_n$ derived by polymerization of formaldehyde.

I claim:

1. A cable mechanism including a flexible cable within a protective casing which is used for repeated assembly to and disassembly from a rotary mechanism having an externally extending housing extension with an annular flange and a terminal hub and, having a shaft rotatable therein engageable with said flexible cable, the improvement comprising a coupling of flexible material having a body including a casing engaging portion adapted to engage an end of said protective casing, a hub engaging portion adapted to encircle said terminal hub, an oblong ring portion having elongated sides spaced apart a distance less than the outside diameter of said annular flange of said extension, and radial end portions integral therewith, and strut means connecting said radial end portions of said ring portion to said hub portion of said body in axially spaced relation thereto.

2. A cable mechanism according to claim 1 wherein said coupling includes an internal transverse wall having an axial opening therein positioned at the junction between said casing engaging portion and said hub engaging portion.

3. A plastic coupling for a flexible shaft rotatably mounted within a casing, the coupling comprising a first tubular portion adapted to encircle an end of said casing, a second tubular portion larger in diameter than said first tubular portion, a transverse wall having an axial opening therein, said transverse wall interconnecting said first tubular portion and said second tubular portion in axial alignment with each other and with said axial opening, an oval ring having spaced apart side portions and radial end portions, and strut means connected to said radial end portions and to the opposite end of said second tubular portion from said transverse wall to position said oval ring in spaced apart relation to said second tubular portion.